United States Patent
Shank et al.

(10) Patent No.: US 10,509,244 B1
(45) Date of Patent: Dec. 17, 2019

(54) OPTICAL SWITCHES AND ROUTERS OPERATED BY PHASE-CHANGING MATERIALS CONTROLLED BY HEATERS

(71) Applicant: GLOBALFOUNDRIES Inc., Grand Cayman (KY)

(72) Inventors: Steven M. Shank, Jericho, VT (US); Anthony K. Stamper, Williston, VT (US); John J. Ellis-Monaghan, Grand Isle, VT (US); Vibhor Jain, Essex Junction, VT (US); John J. Pekarik, Underhill, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/216,027

(22) Filed: Dec. 11, 2018

(51) Int. Cl.
*G02F 1/01* (2006.01)

(52) U.S. Cl.
CPC .................. *G02F 1/0147* (2013.01)

(58) Field of Classification Search
CPC ..................................................... G02F 1/0147
See application file for complete search history.

(56) References Cited

U.S. PATENT DOCUMENTS

| | | | |
|---|---|---|---|
| 6,960,744 B2 | 11/2005 | Adkisson et al. | |
| 6,968,110 B2* | 11/2005 | Patel | G02B 6/12004 257/431 |
| 6,996,305 B2* | 2/2006 | Kim | G02B 6/43 385/14 |
| 7,352,066 B2* | 4/2008 | Budd | G02B 6/43 257/13 |
| 8,098,968 B2 | 1/2012 | Green et al. | |
| 8,200,055 B2* | 6/2012 | Subbaraman | B82Y 20/00 385/10 |
| 8,399,292 B2* | 3/2013 | Doany | G02B 6/4246 438/106 |
| 8,541,884 B2* | 9/2013 | Conn | H01L 23/5384 257/621 |
| 9,219,347 B2* | 12/2015 | Akiyama | H01S 5/1071 |
| 9,496,447 B2* | 11/2016 | Leobandung | H01L 31/105 |
| 9,606,291 B2* | 3/2017 | Ellis-Monaghan | G02B 6/125 |
| 9,740,080 B2* | 8/2017 | Ellis-Monaghan | G02F 1/3137 |
| 9,746,746 B2 | 8/2017 | Mazed et al. | |
| 9,829,635 B2* | 11/2017 | Tu | G02B 6/12007 |
| 9,891,112 B1* | 2/2018 | Abel | G01J 5/0853 |

(Continued)

OTHER PUBLICATIONS

Niklasson et al., "Thermochromic vanadium oxide thin films: Electronic and optical properties", Journal of Physics: Conference Series 559 (2014).

(Continued)

*Primary Examiner* — Andrew Jordan
(74) *Attorney, Agent, or Firm* — Thompson Hine LLP

(57) ABSTRACT

Structures for an optical switch, structures for an optical router, and methods of fabricating a structure for an optical switch. A phase change layer is arranged proximate to a waveguide core, and a heater is formed proximate to the phase change layer. The phase change layer is composed of a phase change material having a first state with a first refractive index at a first temperature and a second state with a second refractive index at a second temperature. The heater is configured to selectively transfer heat to the phase change layer for transitioning between the first state and the second state.

20 Claims, 6 Drawing Sheets

(56) References Cited

U.S. PATENT DOCUMENTS

| | | | |
|---|---|---|---|
| 9,904,009 B2* | 2/2018 | Leobandung | H01L 21/76898 |
| 10,050,715 B1* | 8/2018 | Blanks | H04B 10/5563 |
| 10,197,730 B1* | 2/2019 | Ngu | G02B 6/12002 |
| 2016/0033849 A1* | 2/2016 | Mazed | G02F 1/3132 |
| | | | 398/48 |
| 2016/0116672 A1* | 4/2016 | Leobandung | H01L 21/76898 |
| | | | 385/14 |
| 2016/0195676 A1* | 7/2016 | Yu | G02B 6/1226 |
| | | | 385/11 |
| 2016/0377806 A1* | 12/2016 | Ellis-Monaghan | G02B 6/125 |
| | | | 385/14 |
| 2017/0017039 A1* | 1/2017 | Tu | G02B 6/12007 |
| 2017/0082873 A1* | 3/2017 | Zia | G02F 1/0115 |
| 2017/0102563 A1* | 4/2017 | Luo | G02F 1/025 |
| 2018/0024072 A1* | 1/2018 | Han | G01N 21/41 |
| | | | 435/7.1 |
| 2019/0187061 A1* | 6/2019 | Han | G01N 21/41 |

OTHER PUBLICATIONS

Currie et al., "Characterizing the tunable refractive index of vanadium dioxide", vol. 7, No. 5 | May 1, 2017 | Optical Materials Express 1697.

Joushaghani et al., "Wavelength-size hybrid Si-VO2 waveguide electroabsorption optical switches and photodetectors", © 2015 Optical Society of America.

Gill et al., "Demonstration of Error-Free 32-Gb/s Operation From Monolithic CMOS Nanophotonic Transmitters", IEEE Photonics Technology Letters, vol. 28, No. 13, Jul. 1, 2016.

* cited by examiner

OPTICAL SWITCHES AND ROUTERS OPERATED BY PHASE-CHANGING MATERIALS CONTROLLED BY HEATERS

BACKGROUND

The present invention relates to photonics chips and, more specifically, to structures for an optical switch, structures for an optical router, and methods of fabricating a structure for an optical switch.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

An optical switch routes an incoming optical signal from an input to a destination output without converting the optical signal to an electrical signal. Optical switches may be formed, for example, using Mach-Zehnder interferometer (MZI) modulators. A disadvantage of this type of switching is that MZI modulators exhibit a weak electro-optic effect and, for that reason, must have a large form factor that results in a large footprint on the photonics chip. During operation, MZI modulators also tend to consume large amounts of power.

Improved structures for an optical switch, structures for an optical router, and methods of fabricating a structure for an optical switch are needed.

SUMMARY

In an embodiment of the invention, a structure includes a waveguide core, a phase change layer arranged proximate to the waveguide core, and a heater proximate to the phase change layer. The phase change layer is composed of a phase change material having a first state with a first refractive index at a first temperature and a second state with a second refractive index at a second temperature, and the heater is configured to selectively transfer heat to the phase change layer for transitioning between the first state and the second state.

In an embodiment of the invention, a method includes patterning a waveguide core, depositing a phase change layer arranged proximate to the waveguide core, and forming a heater proximate to the phase change layer. The phase change layer is composed of a phase change material having a first state with a first refractive index at a first temperature and a second state with a second refractive index at a second temperature. The heater is configured to selectively transfer heat to the phase change layer for transitioning between the first state and the second state.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
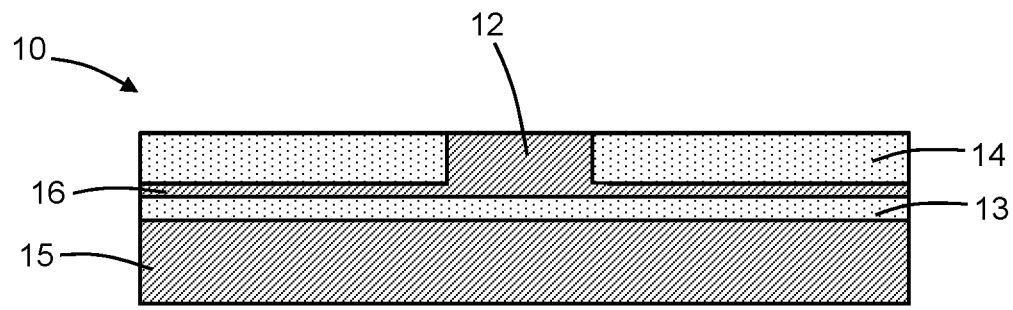
FIG. 1 is a cross-sectional view of a structure for an electro-optic modulator at an initial fabrication stage of a processing method in accordance with embodiments of the invention.

With reference to FIG. 1 and in accordance with embodiments of the invention, a structure 10 for an electro-optic modulator includes a waveguide core 12 embedded in shallow trench isolation regions 14. The waveguide core 12 may be formed by lithography and etching processes from a single-crystal semiconductor material (e.g., single-crystal silicon), such as a device layer 16 of a silicon-on-insulator (SOI) wafer. The etching process forming the waveguide core 12 may only partially etch through the device layer 16 surrounding the waveguide core 12. The shallow trench isolation regions 14, which fill the space surrounding the waveguide core 12 as lateral cladding, may be composed of a dielectric material, such as silicon dioxide, that is deposited and planarized by chemical-mechanical polishing. The waveguide core 12 and device layer 16 are arranged over a buried insulator layer 13 and a substrate 15 of the SOI wafer. The waveguide core 12 is configured to propagate optical signals on a photonics chip.

Figure 2:
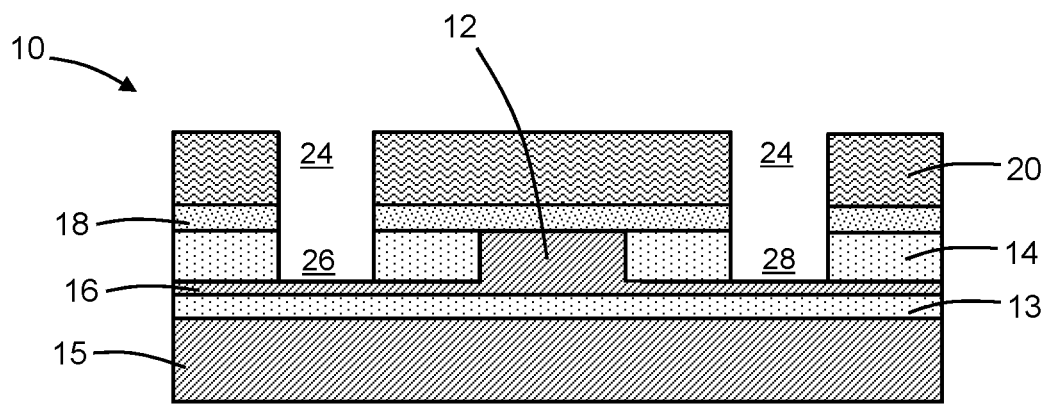
FIG. 2 is a cross-sectional view of the structure at a fabrication stage subsequent to FIG. 1.

With reference to FIG. 2 in which like reference numerals refer to like features in FIG. 1 and at a subsequent fabrication stage, a dielectric layer 18 composed of a dielectric material, such as silicon nitride, is deposited over the waveguide core 12 and shallow trench isolation regions 14, and an etch mask 20 is formed over the dielectric layer 18 by a lithography process. The etch mask 20 may include a lithography stack containing a photoresist and a bottom anti-reflection coating in which the photoresist may be applied as a fluid by a spin coating process, pre-baked, exposed to light projected through a photomask, baked after exposure, and developed with a chemical developer, and in which the bottom anti-reflection coating may be applied before the photoresist is applied and patterned after the photoresist is developed. The etch mask 20 includes openings 24 that are arranged over the dielectric layer 18 covering the shallow trench isolation regions 14 and respectively adjacent to the respective opposite sidewalls of a section of the waveguide core 12. Other portions of the etch mask 20 fully cover the remainder of the dielectric layer 18.

The dielectric layer 18 and the shallow trench isolation regions 14 are etched with one or more etching processes at the location of the openings 24 in the etch mask 20 to form trenches 26, 28 in the shallow trench isolation regions 14. The trenches 26, 28 are only partially extended by the etching process through the thickness of the shallow trench isolation regions 14 such that a partial thickness of the shallow trench isolation regions 14 initially covers the device layer 16 at the location of the trenches 26, 28. The etch mask 20 is removed after forming the trenches 26, 28. The partial thickness of the shallow trench isolation regions 14 at the base of the trenches 26, 28 is removed by an etching process, such as a pre-clean to prepare for a silicidation process, to expose respective portions of the device layer 16 at the base of the trenches 26, 28.

Figure 3:
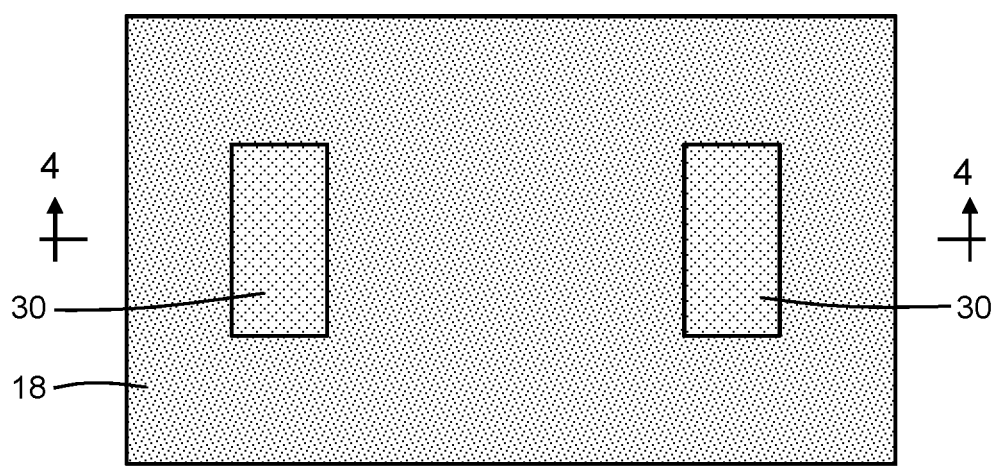
FIG. 3 is a top view of the structure at a fabrication stage subsequent to FIG. 2.
Figure 4:
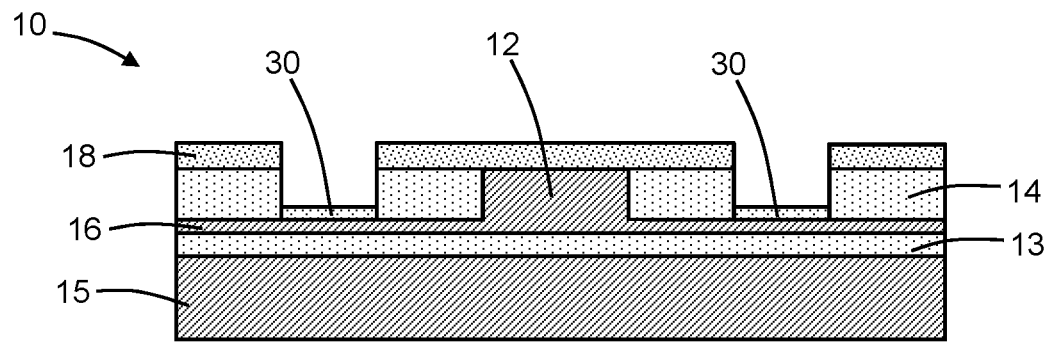
FIG. 4 is a cross-sectional view of the structure taken generally along line 4-4 in FIG. 3.

With reference to FIGS. 3, 4 in which like reference numerals refer to like features in FIG. 2 and at a subsequent fabrication stage, a silicide layer 30 may be formed in sections that are arranged inside the trenches 26, 28 over the respective portions of the device layer 16 at the base of the trenches 26, 28. The sections of the silicide layer 30 inside the different trenches 26, 28 provide individual resistance heaters that respond to an applied current by resistive heating.

The silicide layer 30 may be formed by a silicidation process involving the deposition of a layer of a silicide-forming metal by, for example, chemical vapor deposition or physical vapor deposition, followed by one or more annealing steps (e.g., rapid thermal annealing) to form a silicide phase by reacting the layer of silicide-forming metal and the contacting semiconductor material of the device layer 16. Because the silicide-forming metal does not react with contacted dielectric material, such as the dielectric layer 18, the silicidation process is self-aligned to the sections of the device layer 16 that are exposed within the trenches 26, 28. Candidate materials for the silicide-forming metal include, but are not limited to, nickel, titanium, cobalt, palladium, or a combination of these metals or other metals capable of reacting with silicon to form a low-resistivity, thermally-stable silicide. Before annealing, a capping layer comprised of a metal nitride, such as sputter-deposited titanium nitride, may be applied to cover the silicide-forming metal. An initial annealing step of the silicidation process may form a metal-rich silicide that consumes the silicide-forming metal and then form a silicide of lower metal content that grows by consuming the metal-rich silicide. Following the initial annealing operation, any remaining silicide-forming metal and the optional capping layer may be removed by wet chemical etching. The silicide layer 30 may then be subjected to an additional annealing operation at a higher temperature to form a lower-resistance silicide phase of higher metal content, followed by removing any remaining silicide-forming metal by wet chemical etching.

Figure 5:
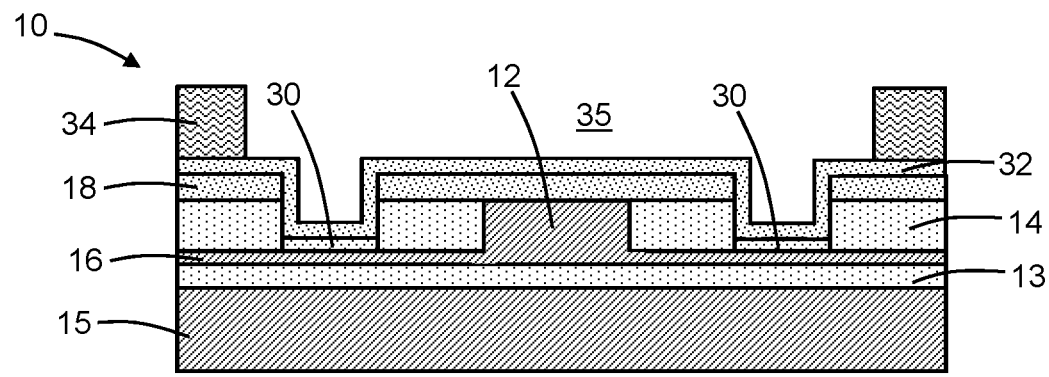
FIGS. 5-6 are cross-sectional views of the structure at successive fabrication stages subsequent to FIG. 4.

With reference to FIG. 5 in which like reference numerals refer to like features in FIG. 4 and at a subsequent fabrication stage, a conformal dielectric layer 32 composed of a dielectric material, such as silicon nitride, is formed by, for example, atomic layer deposition over the dielectric layer 18 and over the sections of the silicide layer 30 inside the trenches 26, 28. An etch mask 34 is formed over the conformal dielectric layer 32 by a lithography process. The etch mask 34 may include a lithography stack containing a photoresist and a bottom anti-reflection coating in which the photoresist may be applied as a fluid by a spin coating process, pre-baked, exposed to light projected through a photomask, baked after exposure, and developed with a chemical developer, and in which the bottom anti-reflection coating may be applied before the photoresist is applied and patterned after the photoresist is developed. The etch mask 34 includes an opening 35 that is arranged over the conformal dielectric layer 32 covering the sections of the silicide layer 30, the section of the waveguide core 12 arranged between the trenches 26, 28, and portions of the shallow trench isolation regions 14 arranged between the section of the waveguide core 12 and the trenches 26, 28. Other portions of the etch mask 34 fully cover the remainder of the conformal dielectric layer 32.

Figure 6:
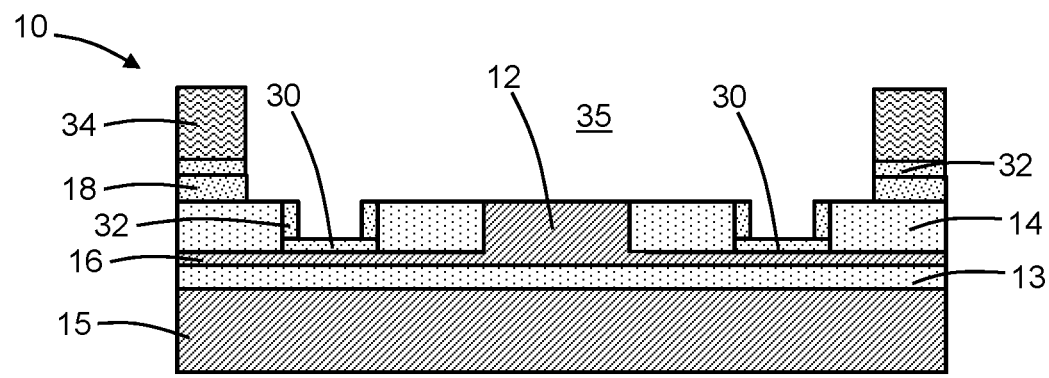

With reference to FIG. 6 in which like reference numerals refer to like features in FIG. 5 and at a subsequent fabrication stage, the dielectric layer 18 and the conformal dielectric layer 32 are etched with an etching process, such as a reactive ion etching process, and removed over the area exposed inside the opening 35 in the etch mask 34 with the exception of spacers that are formed from the conformal dielectric layer 32 at the sidewalls of the trenches 26, 28. The removal of the dielectric layers 18, 32 exposes sections of the silicide layer 30 and the section of the waveguide core 12 between the sections of the silicide layer 30. The etch mask 34 is removed after etching the dielectric layers 18, 32.

Figure 7:
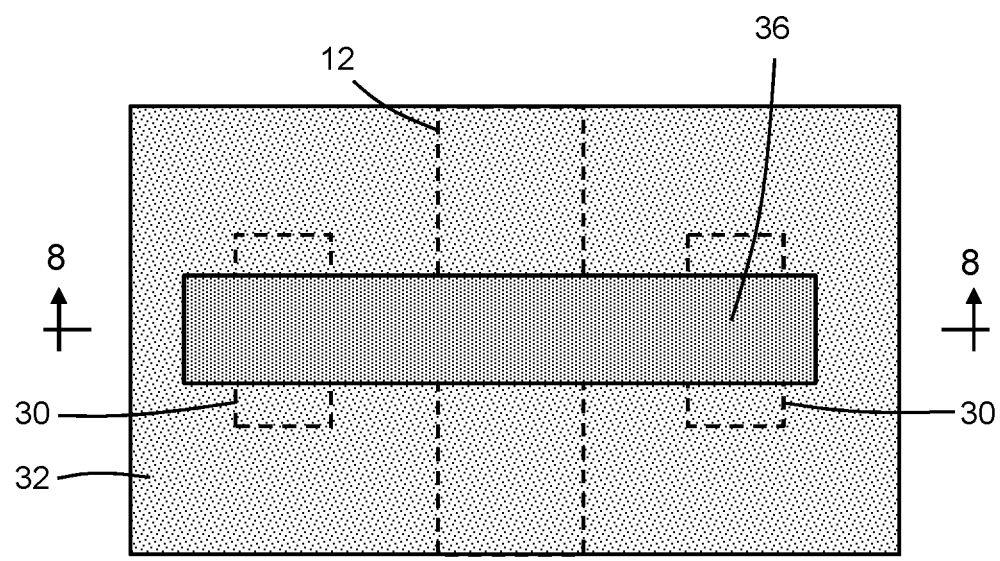
FIG. 7 is a top view of the structure at a fabrication stage subsequent to FIG. 6.
Figure 8:
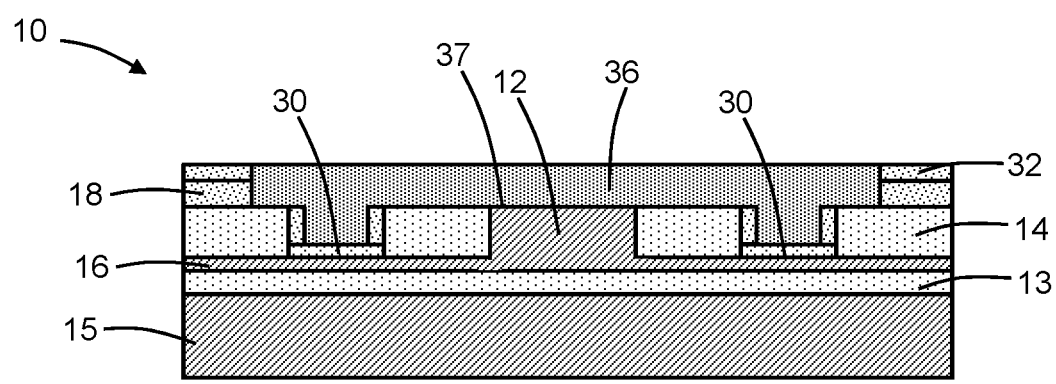
FIG. 8 is a cross-sectional view of the structure taken generally along line 8-8 in FIG. 7.

With reference to FIGS. 7, 8 in which like reference numerals refer to like features in FIG. 6 and at a subsequent fabrication stage, a layer 36 composed of a material with material properties exhibiting a change in index of refraction and optical signal absorption with heating is deposited and patterned with lithography and etching processes. In an embodiment, the layer 36 may be composed of a phase change material that changes at a given transition temperature from an insulator phase with different optical properties to a metal phase with different optical properties. In an embodiment, the layer 36 may be composed of a phase change material that changes at a transition temperature in a range between 35° C. and 100° C. from an insulator phase to a metal phase with different optical properties. In an embodiment, the layer 36 may be composed of vanadium dioxide, which changes at a transition temperature of approximately 68° C. from an insulator phase to a metal phase with different optical properties. Vanadium oxide exhibits approximately a unity change in its index of refraction due to the phase change and a ten-fold increase in absorption in its metal phase in comparison with its insulator phase. The changes in optical properties may be used to form an electro-optic modulator or an electro-absorption switch that is compatible with a CMOS process flow.

The layer 36 covers the area exposed by the removal of the dielectric layers 18, 32. The layer 36 may be deposited by, for example, chemical vapor deposition and etched back using the conformal dielectric layer 32 as an etch stop.

A portion of the layer 36 is arranged over the waveguide core 12 and is in direct contact with a top surface 37 of the waveguide core 12. Portions of the layer 36 are arranged over the sections of the silicide layer 30, and portions of the layer 36 are arranged over the shallow trench isolation regions 14 between the waveguide core 12 and the sections of the silicide layer 30. These portions of the layer 36 are respectively in direct contact with the silicide layer 30 and the shallow trench isolation regions 14. The layer 36 may include topography, such as divots at the locations of the trenches 26, 28 in which the sections of the silicide layer 30 are located. The current may be applied to the sections of the silicide layer 30 to cause the layer 36 to heat by Ohm's law to a temperature greater than its insulator-to-metal transition temperature and removed to permit the layer 36 to cool to a temperature less than its insulator-to-metal transition temperature or to be placed in a quiescent state.

Figure 9:
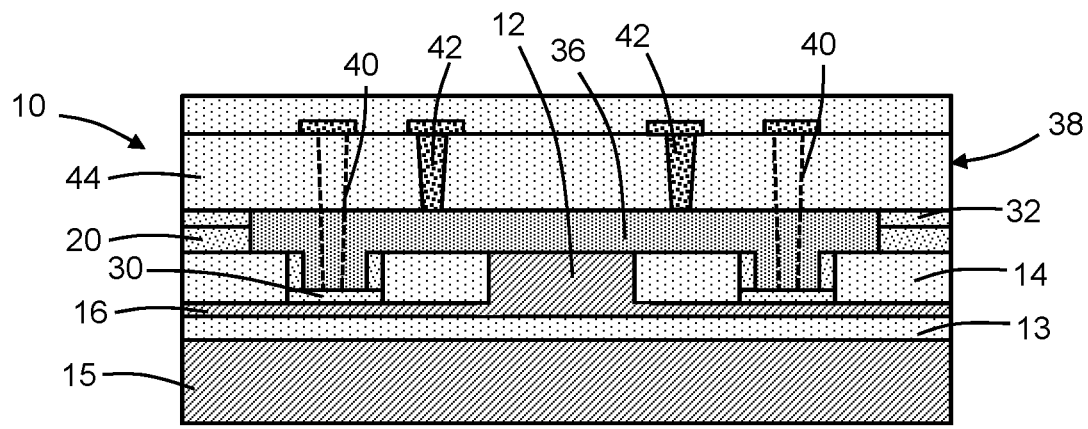
FIG. 9 is a cross-sectional view of the structure at a fabrication stage subsequent to FIG. 8.

With reference to FIG. 9 in which like reference numerals refer to like features in FIG. 8 and at a subsequent fabrication stage, an interconnect structure, generally indicated by reference numeral 38, includes metallization levels that are formed by middle-of-line (MOL) processing and back-end-of-line (BEOL) processing. The interconnect structure 38 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers.

The interconnect structure 38 may include a dielectric layer 44 and contacts 40, 42 arranged in the dielectric layer 44. Contacts 40 may be formed that connect the sections of the silicide layer 30 with wiring in the interconnect structure 38. Contacts 42, which are optional, may be formed that connect the layer 36 with wiring in the interconnect structure 38. The contacts 42 may be used to provide a secondary source of heat by conduction or cooling paths for controlling the temperature of the layer 36. The contacts 40, 42 may be composed of a metal, such as tungsten, copper, or cobalt, and are located in respective etched contact openings in the dielectric layer 44. The dielectric layer 44 may be composed of a dielectric material, such as an oxide of silicon, deposited by chemical vapor deposition and planarized with, for example, chemical mechanical polishing (CMP). For example, the dielectric layer 44 may be composed of silicon dioxide deposited by chemical vapor deposition using ozone and tetraethylorthosilicate (TEOS) as reactants.

Through these connections, a voltage may be applied from the wiring in the interconnect structure to the sections of the silicide layer 30, which causes the sections of the silicide layer 30 to function as heaters used to heat the material in the layer 36 above its transition temperature. The phase change may be used to provide the different optical properties capable of gating the transmission of optical signals through the section of the waveguide core 12 overlapped by the layer 36 and create an optical switch.

Figure 10:
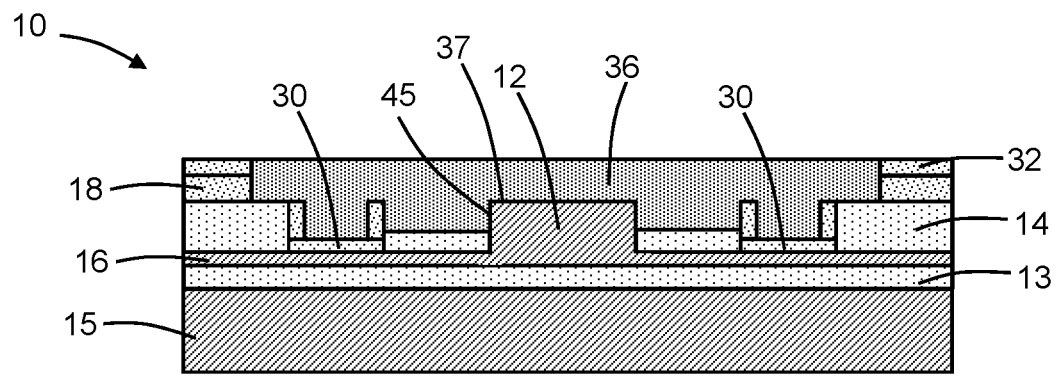
FIGS. 10-12 are cross-sectional views of structures for electro-optic modulators in accordance with alternative embodiments of the invention.

With reference to FIG. 10 in which like reference numerals refer to like features in FIG. 8 and in accordance with alternative embodiments, the shallow trench isolation regions 14 that are arranged between the sections of the silicide layer 30 and the section of the waveguide core 12 may be recessed relative to the waveguide core 12. Specifically, after the dielectric layer 18 and the conformal dielectric layer 32 are etched, the shallow trench isolation regions 14 may be etched and recessed with a selective etching process, such as a wet chemical etching process using a solution containing hydrofluoric acid. The recessing of the shallow trench isolation regions 14 exposes respective upper portions of the opposite sidewalls 45 of the waveguide core 12. The layer 36 fills the spaces opened by the recessing of the shallow trench isolation regions 14 such that the layer 36 directly contacts the sidewalls 45 of the waveguide core 12 in addition to directly contacting the top surface 37 of the waveguide core 12. Respective lower portions of the opposite sidewalls 45 of the waveguide core 12 remain directly contacted by the shallow trench isolation regions 14.

In an alternative embodiment, the shallow trench isolation regions 14 may be fully recessed and removed to expose the device layer 16 surrounding the waveguide core 12, and the layer 36 would contact the entirety of the opposite sidewalls 45 of the waveguide core 12.

Figure 11:
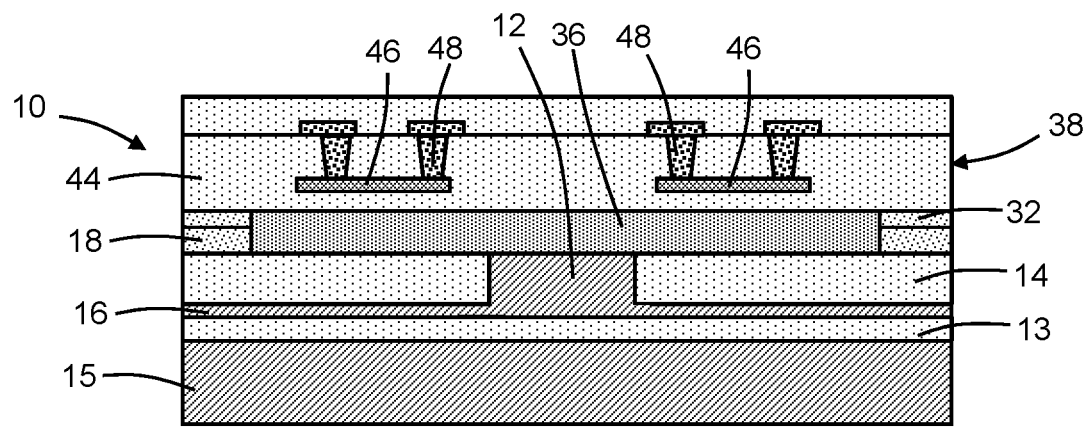

With reference to FIG. 11 in which like reference numerals refer to like features in FIG. 9 and in accordance with alternative embodiments, thin film resistors 46 may be formed in the interconnect structure 38 over the layer 36 and may be connected by contacts 48 with wiring in the interconnect structure 38. The thin film resistors 46 may be composed of a material, such as nickel-chrome, tantalum nitride, or titanium nitride, that generates heat by Ohm's law in response to a current flowing through the material. Similar to the heaters provided by the sections of the silicide layer 30, heat from the thin film resistors 46 may be used to induce the phase change in the layer 36. The thin film resistors 46 may replace the sections of the silicide layer 30 as the heat source of the structure 10. The thin film resistors 46 provide individual resistance heaters that respond to an applied current by resistive heating. The current applied to the thin film resistors 46 may be controlled to heat the layer 36 above its insulator-to-metal transition temperature and to permit the layer 36 to be dormant or cool. The current may be applied to the thin film resistors 46 to cause the layer 36 to heat to a temperature greater than its insulator-to-metal transition temperature and removed to permit the layer 36 to cool to a temperature less than its insulator-to-metal transition temperature or to be placed in a quiescent state.

By forming the thin film resistors 46 in the interconnect structure 38, the etching process forming the waveguide core 12 may etch completely through the device layer 16 surrounding the waveguide core 12 such that the shallow trench isolation regions 14 are in direct contact with the exposed buried insulator layer 13. In an alternative embodiment, the thin film resistors 46 and the sections of the silicide layer 30 may be used in combination to provide heaters used to heat the layer 36 and to generate the phase change.

Figure 12:
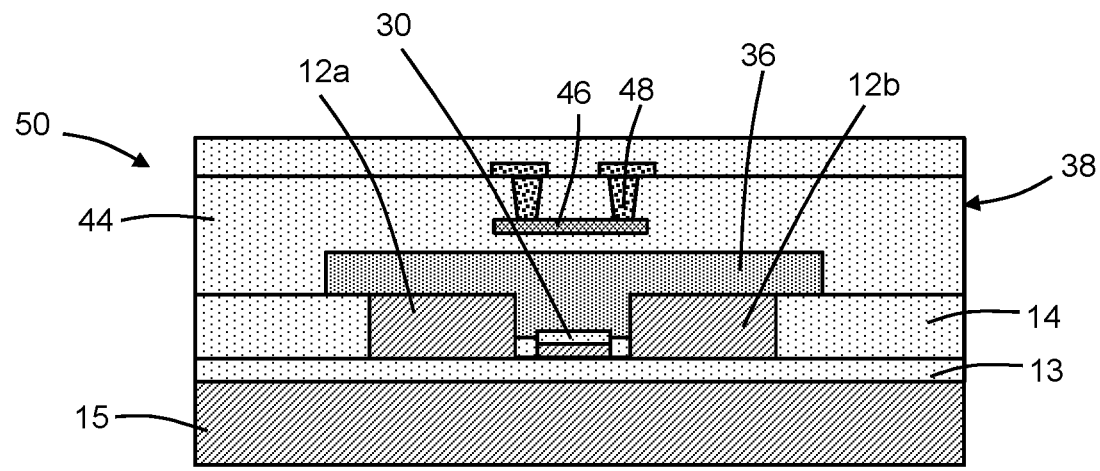

With reference to FIG. 12 in which like reference numerals refer to like features in FIG. 9 and in accordance with alternative embodiments, the layer 36 of a structure 50, which is similar to structure 10, may be placed between a pair of waveguide cores 12a, 12b arranged in proximity to each other for optical signal coupling. The layer 36 is in contact with side surfaces of the waveguide cores 12a, 12b. A thin film resistor 46 may be placed directly over the layer 36, and a section of a silicide layer 30 may be placed directly beneath the layer 36. The thin film resistor 46 and section of the silicide layer 30 are laterally arranged between the waveguide cores 12a, 12b. In alternative embodiments, one or the other of the thin film resistor 46 and the section of the silicide layer 30 may be omitted.

Optical signals may be coupled between the waveguide cores 12a, 12b if the layer 36 is unheated and in its insulator phase characterized by a low absorption. Coupling between the waveguide cores 12a, 12b may be blocked if the layer 36 is heated by current applied to the thin film resistor 46 and/or the section of the silicide layer 30 and in its metal phase characterized by a high absorption.

Figure 13:
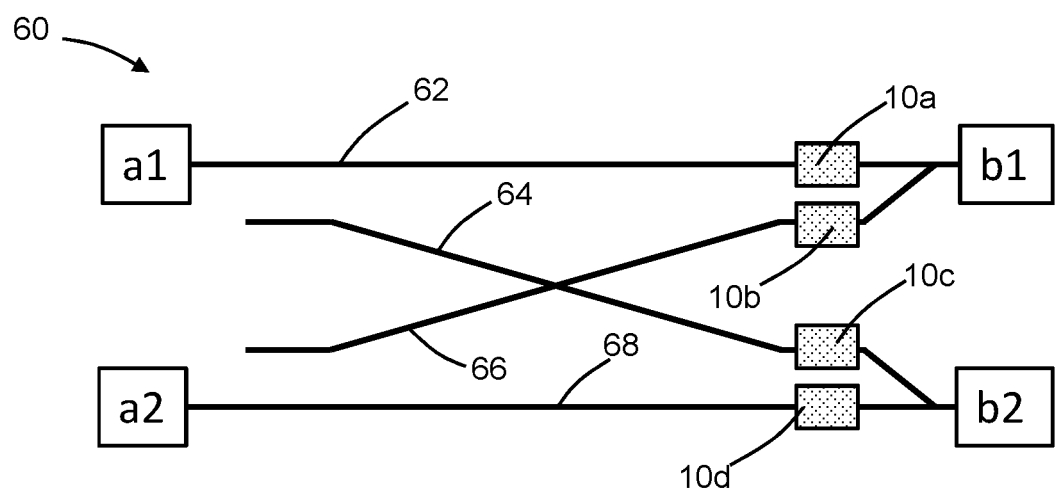
FIG. 13 is a diagrammatic view of a switch formed using electro-optic modulators in accordance with embodiments of the invention.

With reference to FIG. 13 in which like reference numerals refer to like features in FIG. 9 and in accordance with alternative embodiments, a switch 60 may be constructed using instances 10a, 10b, 10c, 10d of the structure 10 each including the layer 36 and one or more heaters supplied by the silicide layer 30 and/or the thin film resistors 46. Specifically, waveguide cores 62, 64, 66, 68 may be arranged such that paths for optical signals may be switched through the operation of the instances 10a, 10b, 10c, 10d of the structure 10. The waveguide core 62 and the waveguide core 66 may have a parallel and spaced-apart arrangement, and the waveguide core 64 and the waveguide core 66 may be arranged as a waveguide crossing that is located between the waveguide core 62 and the waveguide core 66.

In one state of the switch 60, the instances 10b and 10c of the structure 10 may be heated with applied current to induce an insulator-to-metal transition and the instances 10a and 10d of the structure 10 may be unheated (i.e., no applied current), which causes optical signals to be transmitted from a1 to b1 and from a2 to b2. In another state of the switch 60, the instances 10a and 10d of the structure 10 may be heated with applied current to induce an insulator-to-metal transition and the instances 10b and 10c of the structure 10 may be unheated (i.e., no applied current), which causes optical signals to be transmitted through the waveguide crossing from a1 to b2 and/or from a2 to b1.

Figure 14:
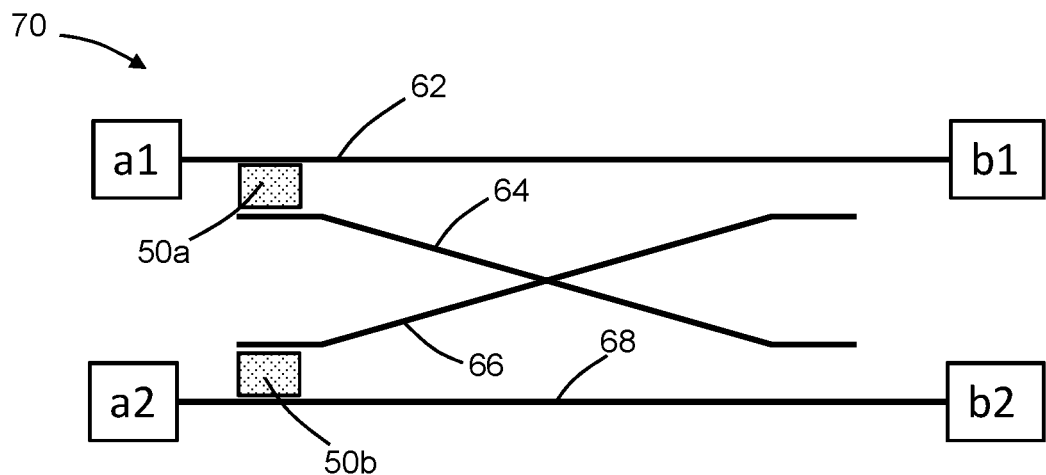
FIG. 14 is a diagrammatic view of a switch formed using electro-optic modulators in accordance with embodiments of the invention.
Figure 15:
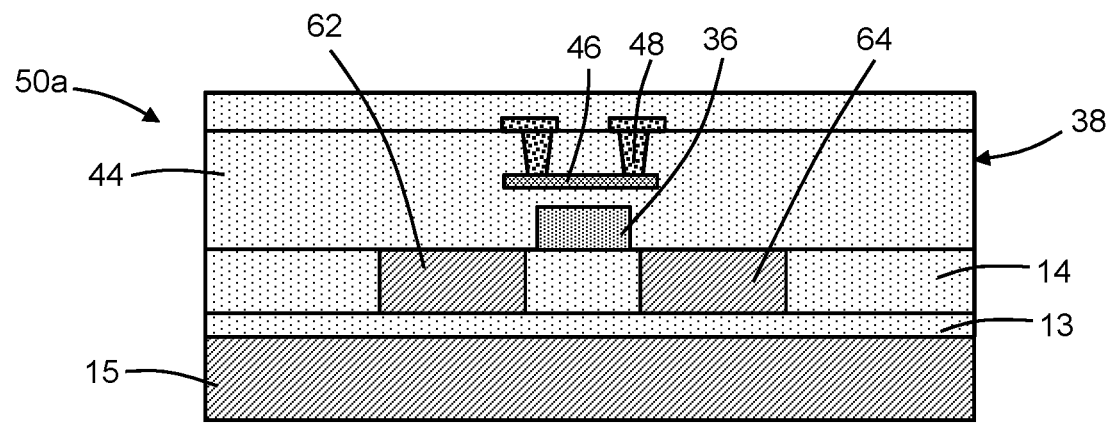
FIG. 15 is a cross-sectional view of a structure for an electro-optic modulator in accordance with alternative embodiments of the invention.

With reference to FIGS. 14, 15 in which like reference numerals refer to like features in FIG. 12 and in accordance with alternative embodiments, a switch 70 may be constructed using instances 50a, 50b of the structure 50 each including the layer 36 and one or more heaters supplied by the silicide layer 30 and/or the thin film resistors 46. The instance 50a of the structure 50 may be arranged over the shallow trench isolation region 14 between the waveguide core 62 and the waveguide core 64, and the instance 50b of the structure 50 (which may be identical to the instance 50a) may be arranged over the shallow trench isolation region 14 between the waveguide core 66 and the waveguide core 68. The instances 50a, 50b of the structure 10 provide electro-optic directional couplers that operate without absorption.

In one state of the switch 70, the instances 50a and 50b of the structure 50 may be unheated (i.e., no applied current), which causes optical signals to be transmitted from a1 to b1 and from a2 to b2. In another state of the switch 70, the instances 50a and 50b of the structure 50 may be heated with applied current to induce an insulator-to-metal transition, which causes optical signals to be transmitted from a1 to b2 and/or from a2 to b1.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core;
   a first phase change layer arranged proximate to the first waveguide core, the first phase change layer comprised of a phase change material having a first state with a first refractive index at a first temperature and a second state with a second refractive index at a second temperature; and
   a first heater proximate to the first phase change layer, the first heater configured to selectively transfer heat to the first phase change layer for transitioning between the first state and the second state.

2. The structure of claim 1 wherein the first phase change layer has a directly contacting relationship with the first waveguide core.

3. The structure of claim 1 wherein the first waveguide core has a top surface, and the first phase change layer has a directly contacting relationship with the top surface of the first waveguide core.

4. The structure of claim 1 further comprising:
   a trench isolation region arranged adjacent to the first waveguide core,
   wherein the first phase change layer is arranged in part over the trench isolation region and in part over the first waveguide core.

5. The structure of claim 1 further comprising:
   a trench isolation region arranged adjacent to the first waveguide core,
   wherein the first waveguide core has a sidewall positioned in part above the trench isolation region, and the first phase change layer is arranged in part over the trench isolation region and in direct contact with the sidewall of the first waveguide core.

6. The structure of claim 1 further comprising:
   a dielectric layer over the first phase change layer; and
   a contact arranged in the dielectric layer, the contact extending to the first phase change layer or to the first heater.

7. The structure of claim 1 wherein the first phase change layer is arranged in part over the first waveguide core, and further comprising:
   a second waveguide core arranged adjacent to the first waveguide core, wherein the first phase change layer is arranged in part over the second waveguide core and in part between the first waveguide core and the second waveguide core.

8. The structure of claim 1 further comprising:
a second waveguide core arranged adjacent to the first waveguide core,
wherein the first phase change layer is arranged between the first waveguide core and the second waveguide core.

9. The structure of claim 1 wherein the phase change material is comprised of vanadium oxide, and the first waveguide core is comprised of single-crystal silicon.

10. The structure of claim 1 wherein the phase change material has a transition temperature, the first temperature is less than the transition temperature, the second temperature is greater than the transition temperature, the phase change material is an insulator in the first state at the first temperature, and the phase change material is a metal in the second state at the second temperature.

11. The structure of claim 1 wherein the first heater is arranged under the first phase change layer.

12. The structure of claim 11 wherein the first heater is a section of a silicide layer.

13. The structure of claim 1 wherein the first heater is arranged over the first phase change layer.

14. The structure of claim 13 wherein the first heater is a thin film resistor in an interconnect structure.

15. The structure of claim 14 further comprising:
a second heater arranged under the first phase change layer.

16. The structure of claim 1 further comprising:
a second waveguide core arranged adjacent to the first waveguide core,
wherein the first phase change layer is configured to block optical signals propagating in the first waveguide core from being transferred to the second waveguide core when the first phase change layer is in the second state.

17. The structure of claim 16 wherein the first phase change layer is arranged in part over the first waveguide core.

18. The structure of claim 16 further comprising:
a second phase change layer arranged in part over the second waveguide core; and
a second heater proximate to the second phase change layer.

19. The structure of claim 16 wherein the first phase change layer is arranged between the first waveguide core and the second waveguide core.

20. A method comprising:
patterning a waveguide core;
depositing a phase change layer arranged proximate to the waveguide core; and
forming a heater proximate to the phase change layer,
wherein the phase change layer comprised of a phase change material having a first state with a first refractive index at a first temperature and a second state with a second refractive index at a second temperature, and the heater configured to selectively transfer heat to the phase change layer for transitioning between the first state and the second state.

* * * * *